(12) United States Patent
Paulauskas et al.

(10) Patent No.: US 6,514,449 B1
(45) Date of Patent: Feb. 4, 2003

(54) MICROWAVE AND PLASMA-ASSISTED MODIFICATION OF COMPOSITE FIBER SURFACE TOPOGRAPHY

(75) Inventors: Felix L. Paulauskas, Knoxville, TN (US); Terry L. White, Knoxville, TN (US); Timothy S. Bigelow, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 187 days.

(21) Appl. No.: 09/668,246

(22) Filed: Sep. 22, 2000

(51) Int. Cl.$^7$ .......................... B29C 59/16; H05H 1/46
(52) U.S. Cl. .................. 264/400; 264/167; 264/446; 264/448; 264/483
(58) Field of Search ................................ 264/167, 400, 264/446, 448, 469, 483

(56) References Cited

U.S. PATENT DOCUMENTS

| | | |
|---|---|---|
| 3,476,703 A | 11/1969 | Wadsworth |
| 3,634,220 A | 1/1972 | Goan |
| 3,642,513 A | 2/1972 | Sach et al. |
| 3,720,536 A | 3/1973 | Scola et al. |
| 3,723,607 A | 3/1973 | Kalnin et al. |
| 3,767,774 A | 10/1973 | Hou |
| 3,813,282 A | 5/1974 | Magotti et al. |
| 3,824,398 A | 7/1974 | Boom |
| 3,853,600 A | 12/1974 | Hou |
| 3,872,278 A | 3/1975 | Boom |
| 4,197,282 A | 4/1980 | Bailly-Lacresse et al. |
| 4,374,114 A | 2/1983 | Kim et al. |
| 4,574,108 A | 3/1986 | Fakirov et al. |
| 5,178,726 A | 1/1993 | Yu et al. |
| 5,286,550 A | 2/1994 | Yu et al. |
| 5,332,625 A | 7/1994 | Dunn et al. |
| 5,389,195 A | 2/1995 | Ouderkirk et al. |
| 5,705,233 A | 1/1998 | Denes et al. |
| 6,372,192 B1 * | 4/2002 | Paulauskas et al. ...... 423/447.7 |

FOREIGN PATENT DOCUMENTS

| | | |
|---|---|---|
| EP | 0 062 491 A2 | 10/1982 |
| EP | 0 129 366 A2 | 12/1984 |
| EP | 0 191 680 A1 | 8/1986 |

OTHER PUBLICATIONS

Jones, C. and Sammann, E., "The Effect of Low Power Plasmas on Carbon Fibre Surfaces," *Carbon*, vol. 28, No. 4, 509–514 (1990).

Jones, C. and Sammann, E., "The Effect of Low Power Plasmas on Carbon Fibre Surfaces: A Comparison Between Low and High Modules Pan Based Fibres with Pitch Based Carbon Fibres," *Carbon*, vol. 28, No. 4, 515–519 (1990).

Chan, "*Polymer Surface Modification and Characterization*", Hanser Publishers, 225–263 (1994).

(List continued on next page.)

Primary Examiner—Leo B. Tentoni
(74) Attorney, Agent, or Firm—Quarles & Brady LLP

(57) ABSTRACT

The present invention introduces a novel method for producing an undulated surface on composite fibers using plasma technology and microwave radiation. The undulated surface improves the mechanical interlocking of the fibers to composite resins and enhances the mechanical strength and interfacial sheer strength of the composites in which they are introduced.

28 Claims, 7 Drawing Sheets

OTHER PUBLICATIONS

"High Performance Polymers and Composites," Encyclopedia Reprint Series, 20–45 (1991).

Liston, et al. "Plasma Surface Modification of Polymers for Improved Adhesion: A Citical Review," *J. Adhesion Set Technal*, vol. 7, No. 10 pp. 1091–1127 (1993).

Mittal, *"Adhesion Promotion Techniques,"* Marcel Dekker, Inc. 139–159 (1999).

Mittal, *"Handbook of Adhesive Technology,"* Marcel Dekker, Inc. 35–45 (1994).

Peebles,*"Carbon Fibers"*, 128–134 (Undated).

Pocius, *"Adhesion and Adhesives Technology,"* Hanser Publishers, 156–163 (1997).

Rebouillat, *"Carbon Fibers,"* Marcel Dekker, Inc., pp. 179–189 (1998).

Sittig, *"Carbon and Graphite Fibers,"* Noyes Data Corporation, 191–229 (1980).

Wertheimer, et al., "Plasma Treatment of Polymers," 160–173 (Undated).

\* cited by examiner

MICROWAVE AND PLASMA-ASSISTED MODIFICATION OF COMPOSITE FIBER SURFACE TOPOGRAPHY

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DE-AC05-00OR22725 awarded by the U.S. Department of Energy to UT-Battelle, LLC.

CROSS-REFERENCE TO RELATED APPLICATIONS

Not Applicable.

FIELD OF THE INVENTION

The present invention relates to the modification of organic and inorganic fibers using plasma technology and microwave radiation. More specifically, the present invention relates to a method for producing an undulated surface on reinforcement fibers using microwave radiation and a non-uniform plasma energy.

BACKGROUND OF THE INVENTION

Advanced structural composites are reinforced polymers constructed using a matrix material and one or more reinforcement elements, such as fibers, filaments, or elongated particles. They are generally lightweight and possess superior strength and elasticity over most metals, and are often used as structural members in the aerospace industry and in high-tech space applications. Advanced structural composites are also used in other broader commercial applications where low weight and high mechanical strength materials are required, such as tennis rackets, fishing poles and golf clubs.

In general, the mechanical properties of the composite depend primarily upon the reinforcement elements selected and their ability to interact with the matrix material, usually a polymeric resin. The intrinsic mechanical properties of these two constituents are very different and, therefore, each constituent serves a different function. The function of the matrix material is to bind the reinforcement elements together to form a coherent structure, and to provide a medium for transferring applied loads from one element to another. The matrix material also provides the composite with its high temperature mechanical properties, transverse strength and moisture resistance, and is a key factor in providing toughness, shear strength, and oxidation and radiation resistance. The matrix material also strongly influences the fabrication process and the associated parameters for forming intermediate and final products from the composite material.

The reinforcement constituent, on the other hand, functions as the composite's load-bearing element. This is because the strength of the reinforcement material is generally many orders of magnitude greater than the matrix material. As a result, the matrix resin can generally tolerate higher levels of deformation than the reinforcement material. This higher tolerance allows the matrix system to distribute applied loads from one reinforcement element to another. For this reason, good bonds between the reinforcement elements and the matrix resin are extremely important for composites subjected to loads, particularly shear-critical loads.

If fibers are selected as the reinforcement element, a broad spectrum of fibers with variable mechanical properties can be used. For example, one commonly used fiber is the carbon fiber. Carbon fibers have a very high strength and/or stiffness when compared to polymeric resins. Other fibers include fibers made of glass, nylon, rayon, cellulose, aramide, polyethylene, polypropylene, silicon carbide and more.

Early studies with carbon and glass fiber have demonstrated that surface treatments can lead to improved interfacial adhesion and, thus, better mechanical composite properties. In the case of carbon fiber reinforcement, these surface treatments were targeted toward the improvement of the chemical bond between the carbon fiber and the epoxy matrix resin.

Fiber manufacturers have developed many fiber surface treatments to modify the characteristics of polymer surfaces and to enhance their adhesion to resin matrices. These technologies include anodic oxidation, electro-deposition, wet and dry oxidation, acid etching, low-energy plasma treatments, transcrystallinization, ion implantations, covalent bonding, etc. The basic principle of these technologies is to place chemically active groups on the surface of each fiber. These chemically active groups, in turn, react chemically with other groups in the surrounding matrix to form a strong mechanical bond and, thus, tie the fiber surface and the matrix together.

In low-energy plasma treatments, plasma generated photons and energy particles interact with the fiber surface, usually by free radical chemistry, to enhance the adhesive characteristics of the fiber. The use of low-energy plasma surface treatment is a well known technology, previously discussed at length by Werthelmer et al., "Plasma Treatment of Polymers to Improve Adhesion," *Adhesion Promotion Techniques: Technological Applications,* 139–174 (Mittal and Pizzi, ed., 1999); J. C. M. Peng et al., "Surface Treatment of Carbon Fibers," *Carbon Fibers, Third Edition,* 180–187 (J. B. Donnet et al., ed., 1998); L. H. Peebles, "Plasma Treatment," *Carbon Fibers Formation, Structure, and Properties,* 128–135 (1995); Listen et al., "Plasma Surface Modification of Polymers for Improved Adhesion: A Critical Review," *J. Adhesion Sci. Technol.,* 7:10:1091–1127 (1993); and J. Delmonte, "Surface Treatment of Carbon/Graphite Fibers," *Technology of Carbon and Graphite Fiber Components,* 189–191 (1981).

The use of a plasma surface treatment will generally result in a cleaning of the fiber's surface; an ablation, or etching, of material from the fiber's surface; a cross-linking or branching of the fiber's near-surface molecules; and a modification of the fiber's surface chemical structure. (See Werthelmer et al., supra at 145; and Listen et al., supra at 1096.) Each effect is always present to some degree, although to a variable extent depending upon the fiber substrate, the plasma gas chemistry, the plasma reactor design, and the overall operating parameters. Each of these effects also contributes in a synergistic manner to the enhancement of adhesion. For example, surface cleaning and ablation improves adhesion by removing organic contaminates and weak boundary layers from the fiber's surface. Cross-linking improves adhesion by providing a thin cross-linked layer of molecules on the fiber's surface which mechanically stabilizes the surface and serves as a barrier to inhibit low molecular weight molecules from diffusing into the fiber/matrix interface. Finally, chemical modification, the most dramatic and widely reported effect of plasma, improves adhesion by introducing to the fiber surface new chemical groups capable of interacting and covalently linking with the matrix resin to yield the strongest bonds.

It is also known that ablation may enhance the adhesive characteristics of some polymer surfaces by causing a change in the fiber's surface morphology. This change is usually a result of the cleaning of badly contaminated surfaces, or the removal of weak boundary surface layers formed during the fabrication process, or the treatment of filled or semi-crystalline materials. In particular, plasma removes amorphous polymers many times faster than crystalline polymers or inorganic fillers. Therefore, the over-treatment of polymer surfaces containing zones of amorphous polymers may result in the ablated amorphous zones appearing as random valleys or pits. This change is believed to have the unexpected effect of improving the mechanical interlocking of the polymer surface, while increasing the polymer's surface area available for chemical interactions.

Although it is known that some ablation of reinforcing fibers may improve composite properties, surface treatments for deliberately modifying the topography of fiber surfaces are very limited. This is because present methods generally only provide random ablative activity in those zones containing amorphous polymers, and often require over-treatment of the fiber in order to obtain the modification. Over-treatment, in turn, may also have the undesired effect of reducing the fiber's diameter, resulting in a thin reinforcing fiber having significantly weakened bulk properties. In addition, the etching or pitting of the fiber may result in cornered edges, which may further reduce the bulk properties of the fiber, or create air traps which may interfere with effective fiber/resin binding.

BRIEF SUMMARY OF THE INVENTION

The present invention is summarized in that a novel method is disclosed for producing an undulated surface on reinforcement fibers using a non-uniform microwave generated plasma and microwave radiation. In general, reinforcement fibers are introduced into an oxygen-free atmosphere under pressure, the fibers being under slight tension and at least partially stabilized, and then subjected to a microwave generated plasma flux and microwave radiation, the plasma flux and microwave radiation being varied over either space or time to produce the undulated surface. The plasma is varied by either modulating the power input of the microwave energy or the internal pressure of the plasma chamber in which the plasma is generated, or by altering the angle at which the microwave radiation reacts with the plasma chamber to generate the plasma. Preferably, the plasma is generated in a controlled oxygen free plasma chamber using an oxygen free gas capable of acting as a carrier for the effluents of the processing system. The microwave radiation is generated by a standard microwave generator capable of providing a power input of between 250 W and 100 kW, and more preferably between 750 W and 15 kW.

The undulated surface on the reinforcement fibers can be produced in a batch process, quasi-batch process, or a continuous process. In a continuous process, the intensity of the plasma and the microwave radiation is preferably varied over time to produce the undulated surface on the fiber as it is passed through the plasma field, the intensity variation being induced by either a pulsing of the microwave power level or a gradual change in the microwave power level or a modulation of the internal pressure of the plasma chamber. In a quasi-batch or a batch process the intensity of the plasma and the microwave radiation may be varied over either space or time to create the undulated surface, the variation over space being induced by passing the fiber over a region having a higher intensity of plasma energy or microwave radiation.

Another aspect of the present invention are the fibers produced by the method of the present invention, wherein the cross-sectional area of the fiber is reduced by up to about 50% of its original cross-sectional area, or preferably reduced by up to about 30% of its original cross-sectional area, or more preferably reduced by up to about 15% of its original cross-sectional area.

A principle object of the present invention is to provide a method for increasing the strength of advanced structural composites by improving the mechanical bonding between the composite's resin matrix and its reinforcement fibers.

It is another object of the present invention to provide a novel method for producing an undulated surface on reinforcement fibers in order to improve the fibers' ability to mechanical interlock with composite resins.

It is yet another object of the present invention to utilize plasma technology and electromagnetic radiation to enhance the mechanical binding properties of reinforcement fibers.

One advantage of the present invention is that the surface topography of the fiber can be modified using either a batch, quasi-batch, or continuous system.

Another advantage of the present invention is that the surface of the fiber can be undulated to desired parameters.

Yet another advantage of the present invention is that the use of both a plasma energy and a microwave radiation allows for efficient processing of the reinforcement fibers.

Other objects, features, and advantages will become apparent upon consideration of the following detailed description, drawings and examples.

DETAILED DESCRIPTION OF THE INVENTION

Figure 1:
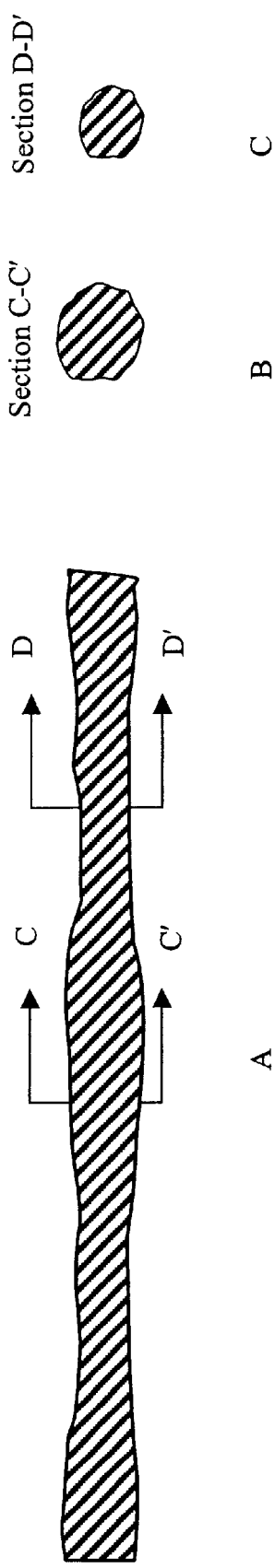
FIGS. 1a, 1b and 1c schematic are example of a fiber filament with its entire circumference modified, including lateral and cross-section views.
Figure 2:
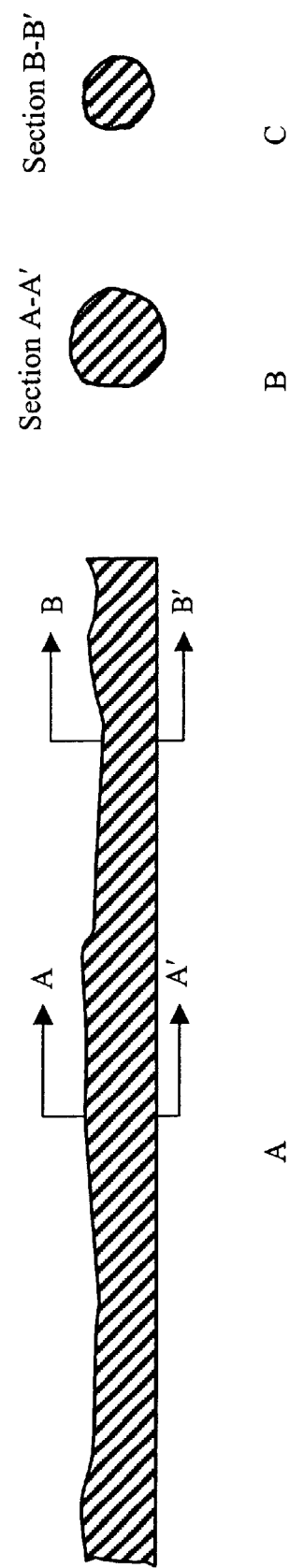
FIGS. 2a, 2b and 2c are schematic example of a fiber filament with a portion of its circumference modified, including lateral and cross-section views.

The present invention utilizes plasma technology in connection with microwave radiation to produce an undulated surface on reinforcement fibers. Fibers so modified are able to more effectively mechanically interlock with composite resins than fibers treated with traditional plasma surface treatments.

The use of accelerated plasma or ions to impact thin surface layers on polymer objects has been described in U.S. Pat. No. 5,389,195 (Ouderkirk et al.). This process uses either short ($10^{-8}$ sec. to $10^{-3}$ sec.) high energy pulses of plasma or ions, or scanned beams of high intensity plasma or high fluence ions and charged and neutral particles to impact the object's thin surface layer and alter its chemistry, topography, density, and/or crystal morphology. The process utilizes a plasma or ion directing device, preferably a coaxial plasma gun (e.g., railgun), as a source for the accelerated plasma. Of particular importance is that both high intensity (high power per unit area) and high energy density are required. These two requirements assure that a substantial amount of heat generated in the very thin surface of treatment in a very short time stays in the surface during the short increments of the process, concentrating the energy into the surface layer. Thermal diffusion, from the thin treatment layer into the bulk, reduces the energy concentration and makes the process less efficient. This process, therefore, requires that only a small amount of heat be dissipated into the bulk during the treatment. The more heat that is dissipated into the bulk, the less efficient the process becomes until so much heat goes into the bulk that the process no longer works.

Unlike the process above, the present invention utilizes microwave radiation and non-uniform microwave generated plasma to ablate the surface of the reinforcement fiber in a controlled manner and produce an undulated surface. It is believed that this ablation is a result of a variety of complex mechanisms arising from the combination of the plasma and the microwave radiation. First, a substantial portion of the microwave radiation couples directly to the plasma to produce a flux of electrons, ions, neutral free radicals, and vacuum ultraviolet radiation which couple with the fiber's surface. These combined fluxes have energies many orders of magnitude higher than the normal thermal fluxes used in conventional processes, thus providing an enhanced processing of the outermost layers of the fiber's surface. Second, the remaining microwave radiation which does not couple to the plasma is adsorbed directly by the fibers. This adsorption is believed to be uniform over the bulk of the cross-section of the fiber as the adsorption depth of the microwave energy is much larger than your typical fiber diameter. This energy goes into simple bulk heating of the fiber, while the plasma and ultraviolet flux preferentially processes only the fiber's surface to enhance the desorption of unwanted compounds.

By modulating the intensity of the plasma and the microwave radiation it is possible to produce an undulated surface on the reinforcement fiber. Depending upon the processing parameters, this undulation can be tailored to a predetermined geometry. More specifically, the cross-sectional diameter of the fiber may be modified along the length of the fiber by varying the intensity of the plasma and the microwave radiation as the fiber passes through the plasma and microwave field. This feature both improves the ability of the fiber to mechanically interlock with composite resins, and increases the surface area of the fiber to provide an increased number of sites for enhanced chemical binding and to allow further distribution of loads applied to the final composite material. The combination of these effects ultimately produce a stronger bond between the fiber and the composite resin than could otherwise be obtained using conventional processes.

As shown in FIGS. 1a–3, the undulated surface is characterized to include a continuous rolling topography of peaks and valleys on the fiber's surface, as compared to the generally linear topography of fibers treated with traditional low-pressure plasma treatments (FIG. 4) or conventional carbon fiber processing. The valleys define regions of reduced cross-sectional area in the fiber (FIGS. 1b and 2b) and are generally formed by exposing the region to an increased level of plasma and microwave radiation. The peaks define regions of the fiber in which the cross-sectional area has been maintained (FIGS. 1c and 2c) or reduced to a lesser extent than the regions defining the valleys. In general, the undulated surface may be produced along the entire length of the fiber, but may also be produced in only specified locations along the fiber's axis. In addition, the undulated surface may be produced along the entire circumference of the fiber (as shown in FIGS. 1a–1c), or produced only along a portion of the fiber's circumference (as shown in FIGS. 2a–2c).

Figure 3:
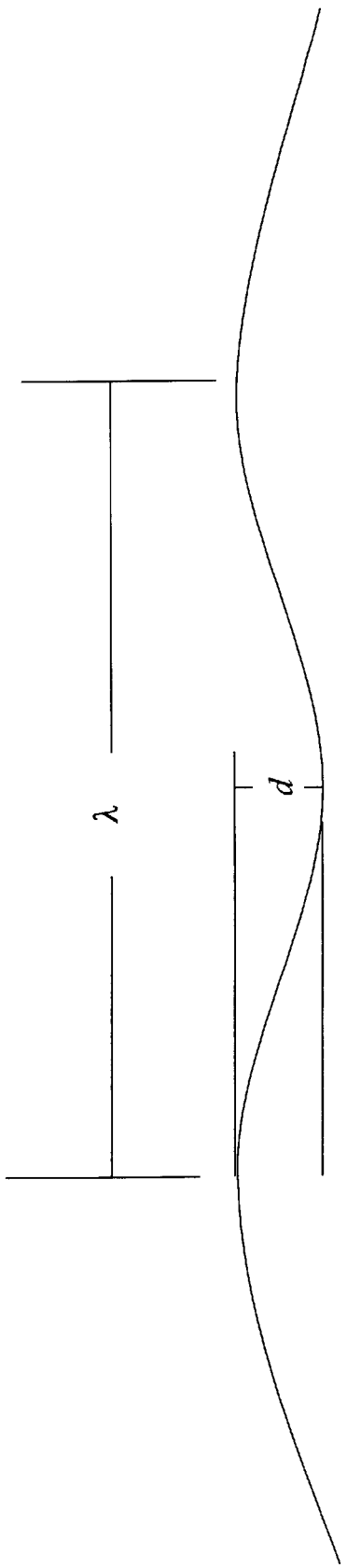
FIG. 3 is a general illustration of the peaks and valleys of an undulated surface produced in accordance with the present invention.
Figure 4:
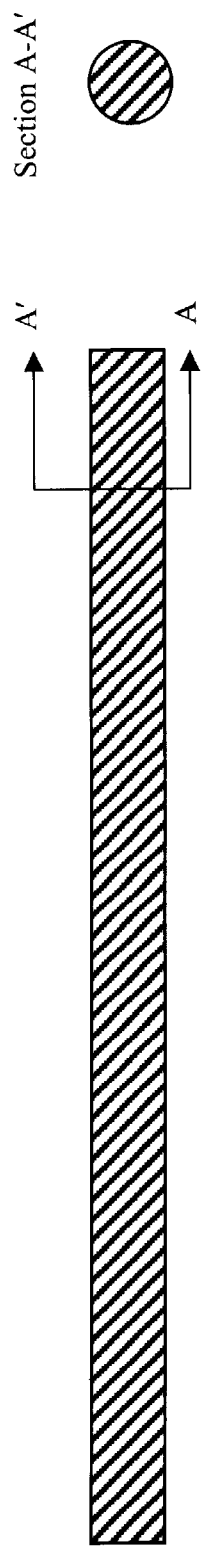
FIG. 4 is a schematic example of a conventional plasma-etched fiber, including lateral and cross-section views.

Referring to FIG. 3, the depth of the valleys (d) and the period between the peaks ($\lambda$) may vary depending upon the type of equipment used (applicator plasma profile), the process controls, the type of precursors or fibers to be processed, the plasma conditions (gas, pressure), and the desired properties of the modified fiber. In general, the depth of the valleys (d) will vary depending upon the diameter of the fiber or precursor being processed, the period between the peaks ($\lambda$), and whether or not the undulated surface is being produced along the entire circumference of the fiber or along only a portion of the fiber. In the preferred embodiment, the cross-sectional area of the fiber is reduced by up to about 50% of its original cross-sectional area, or preferably reduced by up to about 30% of its original cross-sectional area, or more preferably reduced by up to about 15% of its original cross-sectional area. The depth of the valleys (d) may also depend upon the physical properties of the reinforcement fiber. For example, fibers which are more brittle, such as petroleum-based pitch fibers, would preferably only have their cross-sectional areas reduced by up to about 30%, while high strength fibers (having a low or moderate modulus) could have their cross-sectional areas reduced by up to about 50%.

The period ($\lambda$) between the peaks will also vary depending upon the physical properties of the fiber as well as the mechanical properties desired in the final composite material. For example, a more brittle fiber will generally require a gradually change of diameter and, therefore, a greater period between the peaks. A more elastic or ductile fiber, such as a PAN-based fiber with a high elongation at break value, may be able to sustain a more drastic change in diameter and, thus, a shorter period between peaks.

In general the undulated surface is produced on the reinforcement fiber using a non-uniform microwave generated plasma and microwave radiation. The reinforcement fibers modified may include both inorganic and organic fibers which have been at least partially stabilized. Organic fibers may be made of any solid organic, such as natural or synthetic polymeric material, and may include, for example, fibers made of carbon, graphite, nylon, rayon, cellulose, pitch (e.g., petroleum based), polyacrylonitrile (PAN), aramide, polyesters (e.g., polyethyleneterephthalate), polyfluorenes, polyimides, polyamides, polyolefins, polyepoxides, polysiozanes, polyethers, polyetherimides, polysulfones, polyurethanes, fluorinated and/or chlorinated polymers (such as polytetrafluoroethylene), and polyvinyls. Inorganic fibers may be made of solid inorganic material and may include, for example, ceramics (e.g., $SiO_2$, $TiO_2$, etc.) glass, metals, and silica carbide.

The term "plasma" is used to identify gaseous complexes which may comprise electrons, positive or negative ions, gaseous atoms and molecules in the ground state or any higher state of excitation including light quanta. In the preferred embodiment of the present invention, the plasma is considered a low pressure "cold" plasma and generally comprises gas atoms at room temperature and electrons at much higher temperatures. This plasma state provides an ambient gas temperature along with electrons, which have sufficient kinetic energy to cause the cleavage of chemical bonds.

The plasma utilized in the present invention is generated and maintained in a controlled oxygen free plasma chamber having the capacity to control the introduction of oxygen free gases or the removal of off-gases therefrom so as to allow control of the pressures inside the chamber which are induced by the modification process. The gases utilized in the present invention include those oxygen-free gases capable of maintaining a plasma reaction and serving as a carrier for the effluents generated by the modification process. Examples of such gases include, without limitation, argon, nitrogen, helium, hydrogen, or any mixture thereof.

The microwave radiation is preferably produced by an electromagnetic generator capable of producing an electromagnetic discharge in the microwave frequency range. The generator must also have power levels sufficient to produce an undulated surface using the method of the present invention. In one embodiment, the power input by the microwave generator is preferably between 250 W and 100 kW, and more preferably between 750 W and 15 kW.

In general, the undulated surface may be produced on the fiber at any time during the fiber production process. The fiber, however, must be at least partially stabilized in order to avoid the melting of the fiber. Methods for stabilizing such fibers are well known in the art and may be employed as appropriate for the fiber to be modified.

Figure 5:
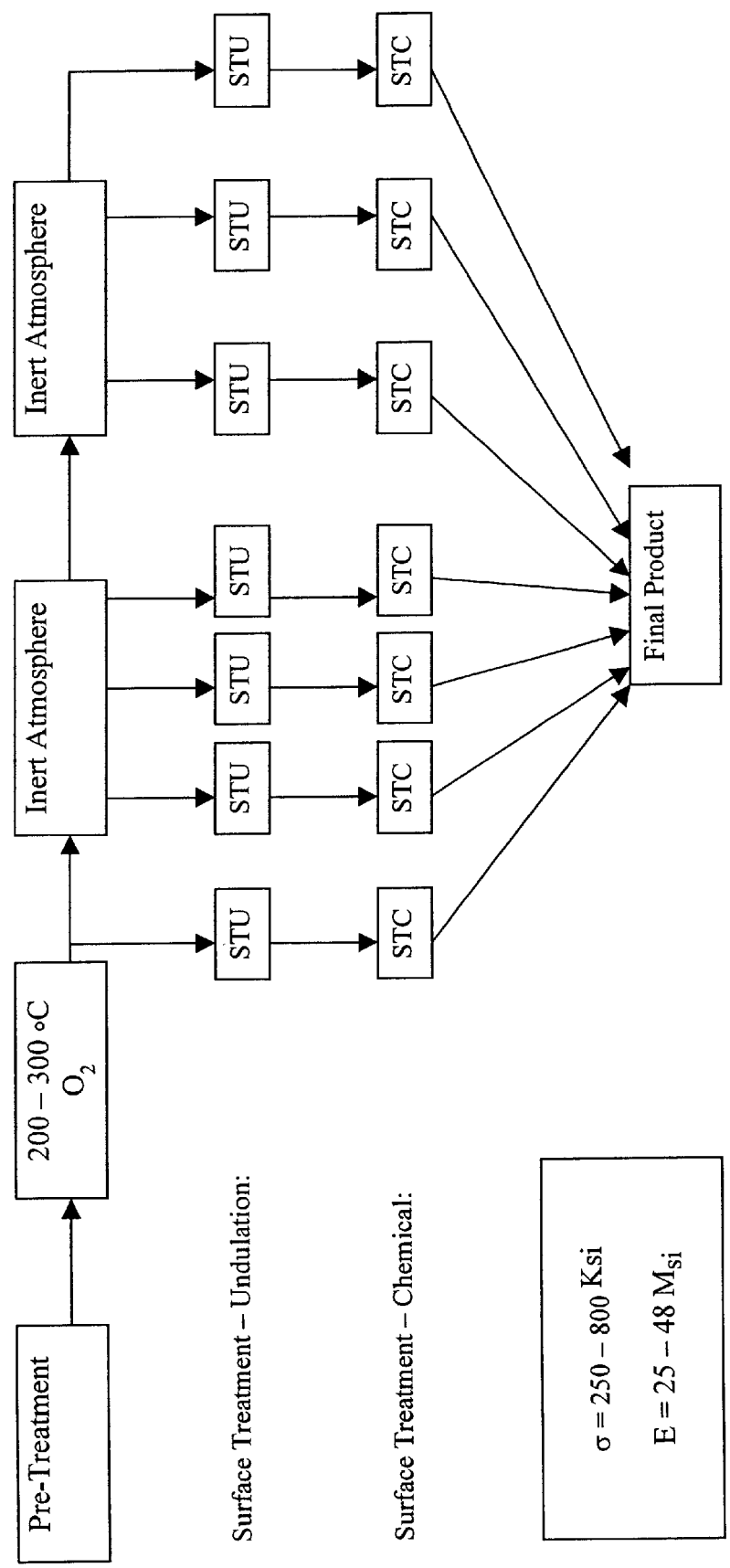
FIG. 5 is a general illustration of the periods in which surface undulation may be performed.

With respect to carbon fibers, the undulated surface can be produced on the fiber at any stage of the carbonization process once the carbon fiber or its precursor is at least partially stabilized. FIG. 5 illustrates the general process for preparing carbon and graphite fibers and the periods in which surface undulation may be performed. In the illustrated process, surface undulation can be performed at any one of several stages during the carbonization or graphitization process.

In the illustrated process of FIG. 5, the processed fiber originates from a carbon fiber precursor. Carbon fiber precursors are generally defined as carbonaceous material previously spun into fiber form and fully or partially stabilized by a stabilization process effective in preparing the material for carbonization. Such fibers and the methods of their manufacture are well known in the art and generally include, without limitation, rayon-based fibers, PAN-based fibers, pitch-based fibers, or any other fiber spun from material capable of being converted into carbon when heat-treated to temperatures in excess of 500° C. Most preferably, the carbon fiber precursor is either a PAN-based or a pitch-based precursor, and more preferably a PAN-based precursor.

Figure 7:
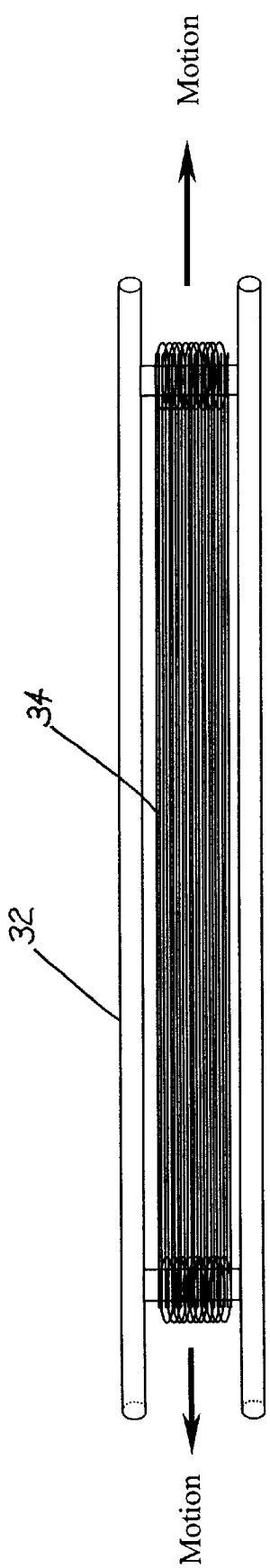
FIG. 7 is a general illustration of a double H frame fiber holder generally used in batch processing systems to physically restrain the stabilized carbon fiber precursors under tension.

The method of the present invention begins by preparing the fiber for processing. This preparation step generally requires placing the fiber under slight tension to ensure the proper alignment of the fiber's internal structure. For example, in batch processes the fiber may be physically restrained in a fixture, such as an H-frame as illustrated in FIG. 7, so that the fiber will come under tension as the modification process proceeds. Meanwhile, in a continuous process, tension may be maintained by rollers or other mechanisms commonly known in the art.

Once prepared, the fibers to be treated are introduced into an oxygen-free plasma chamber where they are subjected to plasma and microwave radiation in an atmosphere of oxygen-free gas. The plasma is initiated during this process by an electrical discharge or an induced dielectric breakdown, depending upon the processing system utilized. In the preferred embodiment, this discharge is created by a high level electromagnetic frequency discharge generated by the microwave generator. The plasma formed in the plasma chamber interacts with the fiber, initiating the pyrolysis of the fiber and increasing the fiber's dielectric loss tangent (tan $\delta$). The raising of the fiber's tan $\delta$, in turn, increases the fiber's coupling efficiency to the microwave radiation.

The coupling of the plasma and microwave radiation generates a uniform application of microwave energy throughout the fiber's cross-section, resulting in a uniform and homogeneous volumetric heating of the bulk fiber material. This heating promotes the mass exchange of oxygen and evolved gases across the entire cross-section of the fiber. As the input power of microwave radiation is increased, the heating temperature across the fiber's cross section is also increased. This increase in heating temperature results in further processing of the fiber's elements and the release of additional off-gases. The released off-gases, in turn, serve as additional fuel for the plasma and will eventually be partially consumed by the reaction or extracted from the chamber in an effluent gas stream.

As the fiber interacts with the plasma, the microwave radiation input power is varied to produce the undulations on the fiber's surface. This input power is preferably varied between 250 W and 100 kW, and more preferably between 750 W and 15 kW, and will depend upon several factors including, among others, the particular reinforcement fiber being modified, the tow of the fibers as they are processed, and the extent of surface undulation desired in the final product.

Unlike the ablation processes using pulsed plasma guns or ion accelerators, the present invention provides a much cleaner method for ablating inorganic and organic surfaces. This is because no metal electrodes or grids are required to generate the plasma and the plasma is not accelerated toward the fibers. In particular, the use plasma guns and ion accelerators to generate pulsed, accelerated plasmas typically requires the creation of a high-energy arc between two metal electrodes. The arc has the added effect of eroding the metal electrodes to produce a large amount of metal impurity ions in the plasma. These metal ions may then be sputtered on the fiber's surface, having a detrimental effect upon the strength of the fiber. Similarly, the accelerator needs metal extraction grids to accelerate the plasma toward the fibers. Metal grids can also create undesirable metal impurities by etching the metal grids with the plasma.

The undulated surface can be produced in either a batch process, a quasi-batch process, or a continuous process. In a continuous process, the intensity of the plasma and the microwave radiation is preferably varied over time to produce the undulated surface on the fiber as it is passed through the plasma field, the intensity variation being induced by either a pulsing of the microwave power level or a gradual change in the microwave power level or a modulation of the internal pressure of the plasma chamber. In a quasi-batch or a batch process the intensity of the plasma and the microwave radiation may be varied over either space or time to create the undulated surface, the variation over space being induced by passing the fiber over a region having a higher intensity of plasma energy or microwave radiation.

For example, the modification of the reinforcement fiber to produce an undulated surface may be performed in a batch system using a microwave glow-discharge plasma applicator designed to provide a non-uniform plasma over a particular length of space. The surface undulation is produced by translating the fiber along the non-uniform plasma field. Alternatively, the surface undulation can be accomplished by slowly pulsing a uniform microwave field over the length of the fiber or by slowly translating the fiber along a non-uniform microwave field.

Figure 6:
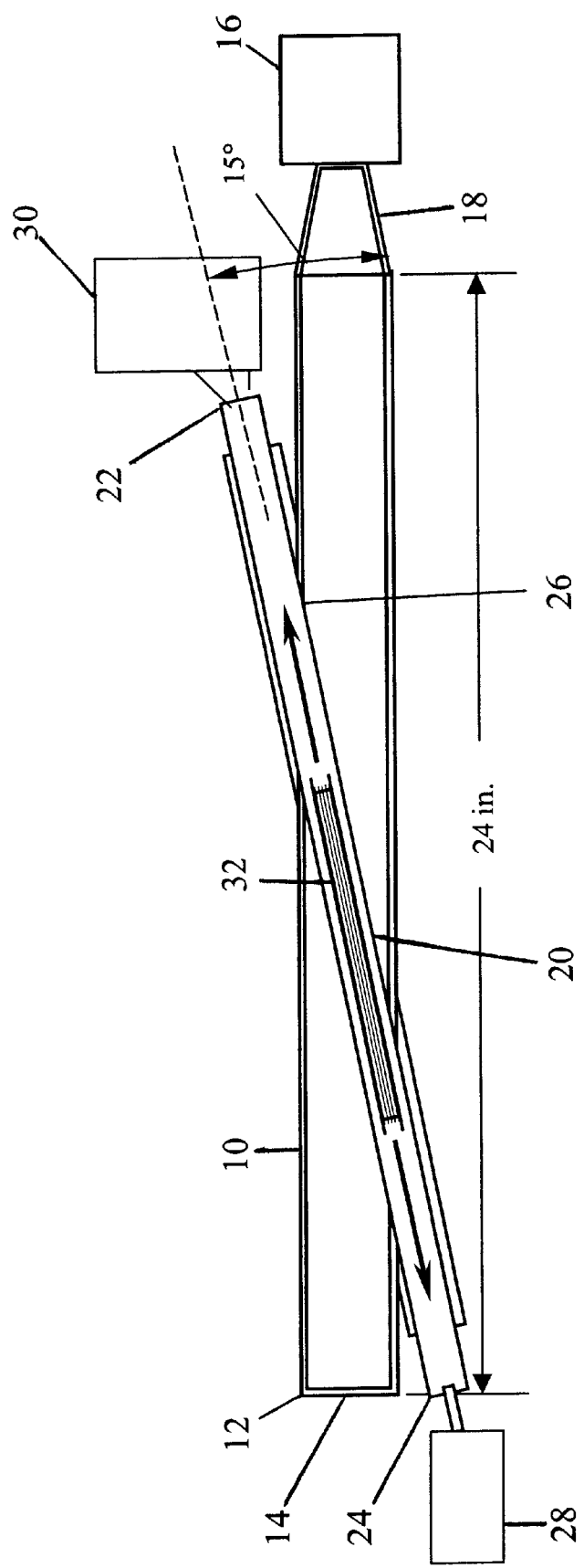
FIG. 6 is a general illustration of a fiber carbonization system capable of batch processing carbon fiber precursors using plasma and microwave radiation.

A plasma applicator system which produces a non-uniform plasma energy over a particular length of space is illustrated in FIG. 6. The plasma applicator includes a section of WR 430 waveguide 10 with inner dimensions of 4.30 in. wide by 2.15 in. high by 24 in. long, having a shorting plate 12 affixed to a first end 14 and a 6-kW, 2.45-GHz microwave generator 16 affixed to a second end 18. A quartz tube 20 having an inlet end 22 and an outlet end 24 passes through the broad wall (4.30 in. wide) of the waveguide 10 at a 15° angle to the waveguide axis so as to be irradiated with microwave radiation generated by the microwave generator 16 and directed towards the quartz tube by the waveguide 10. In the illustrated embodiment, the quartz tube 12 used for the containment of the fiber samples has a nominal outer diameter of 30 mm and thickness of 2.1 mm. The inlet end 22 of the quartz tube is connected to a leak valve 30 for pressure control of inert gases feed into the system while the outlet end 24 is connected to a mechanical vacuum pump 28 for removing off gases generated during the modification process.

A quartz double H-frame 32 holds the carbon fiber sample 34 as shown in FIG. 7. In the illustrated embodiment, the sample consists of a bundle of approximately 48,000 to 50,000 individual fiber filaments, collectively referred to as a "tow" 34. The tow 34 is loosely tied to each end of the double H-frame 32 to allow for natural contraction during processing and placed inside the quartz tube 20.

The 15° angle of the quartz tube 20 is set to allow the plasma absorption of the microwaves to be tapered along the axis of the waveguide 10. The intersection of the quartz tube 20 and the waveguide 10 forms an elliptical slot (not shown), wherein the plasma absorption is strongest at the leading edge 26 of the elliptical slot due to locally enhanced microwave electric fields at the sharp metallic corners created by the acute 15° angle of the quartz tube 20 to the waveguide 10, resulting in an area of increased plasma intensity. (See FIG. 8). This tapering of plasma absorption minimizes the microwave power reflected back toward the microwave generator 16 so that no waveguide tuning elements are required. Accordingly, the waveguide 10 is shorted at the first end 14 since almost all the microwave energy is absorbed in the plasma on the first pass along the quartz tube 20 (the quartz tube has a very low microwave absorption).

Figure 8:
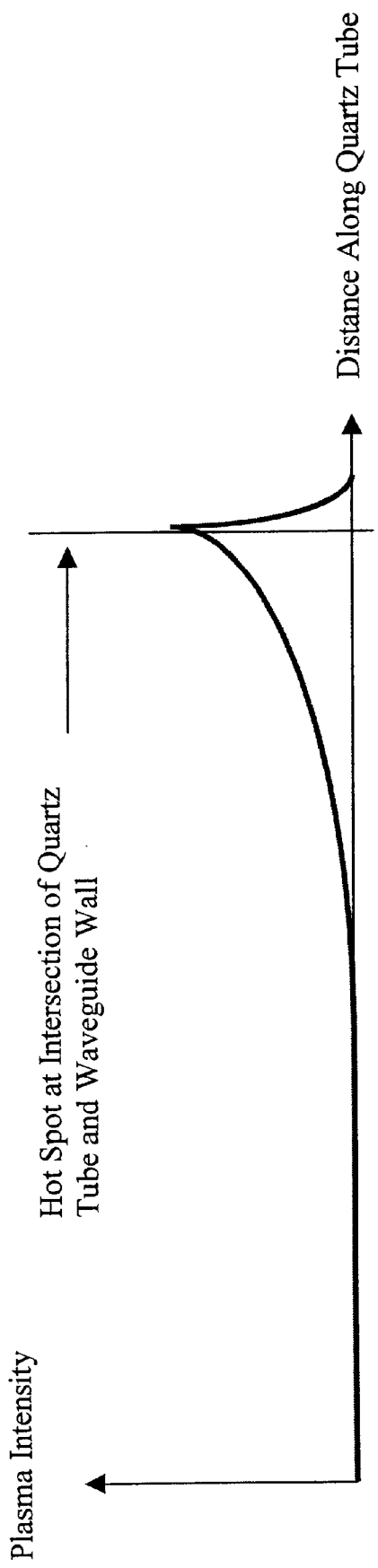
FIG. 8 is a general illustration of the non-uniform plasma flux along the quartz tube of FIG. 6.

Since the microwave fields are peaked at the intersection 26 of the quartz tube 20 and the waveguide 10, the slow translation of the sample 34 on the H-frame 32 back and forth through the applicator 10 allows regions on the tow 34 to be exposed to a slowly varying microwave-generated plasma that has a maximum intensity at the junction of the quartz tube 20 and the leading edge 26 of the waveguide 10 as shown in FIG. 8. In addition, because the energy propagates across the short radius of the quartz discharge, the plasma does not completely absorb all the microwave energy. This remaining energy is strongly absorbed by the tow 34 allowing the interior of the fibers to be heated. The fiber surface, therefore, is heated by a plasma flux while the fiber interior is heated directly by the microwave energy. This combined processing allows the fiber to be processed much more rapidly than either microwave or plasma processing alone.

In the illustrated embodiment, the normal length of the tow 34 is between twelve and twenty-four inches. The maximum possible length inside the applicator at any time is approximately ten to eleven inches. This means that at any given time, only a portion of the tow 34 is exposed to the combined microwave/plasma. For this reason, the local processing time of any one region along the tow 34 will be vary as compared to the overall processing time of the fiber. It is this non-uniform heating combined with the rapid processing which produces a processing gradient along the fiber's axis to produce the undulated surface on the reinforcement fiber.

Figure 9:
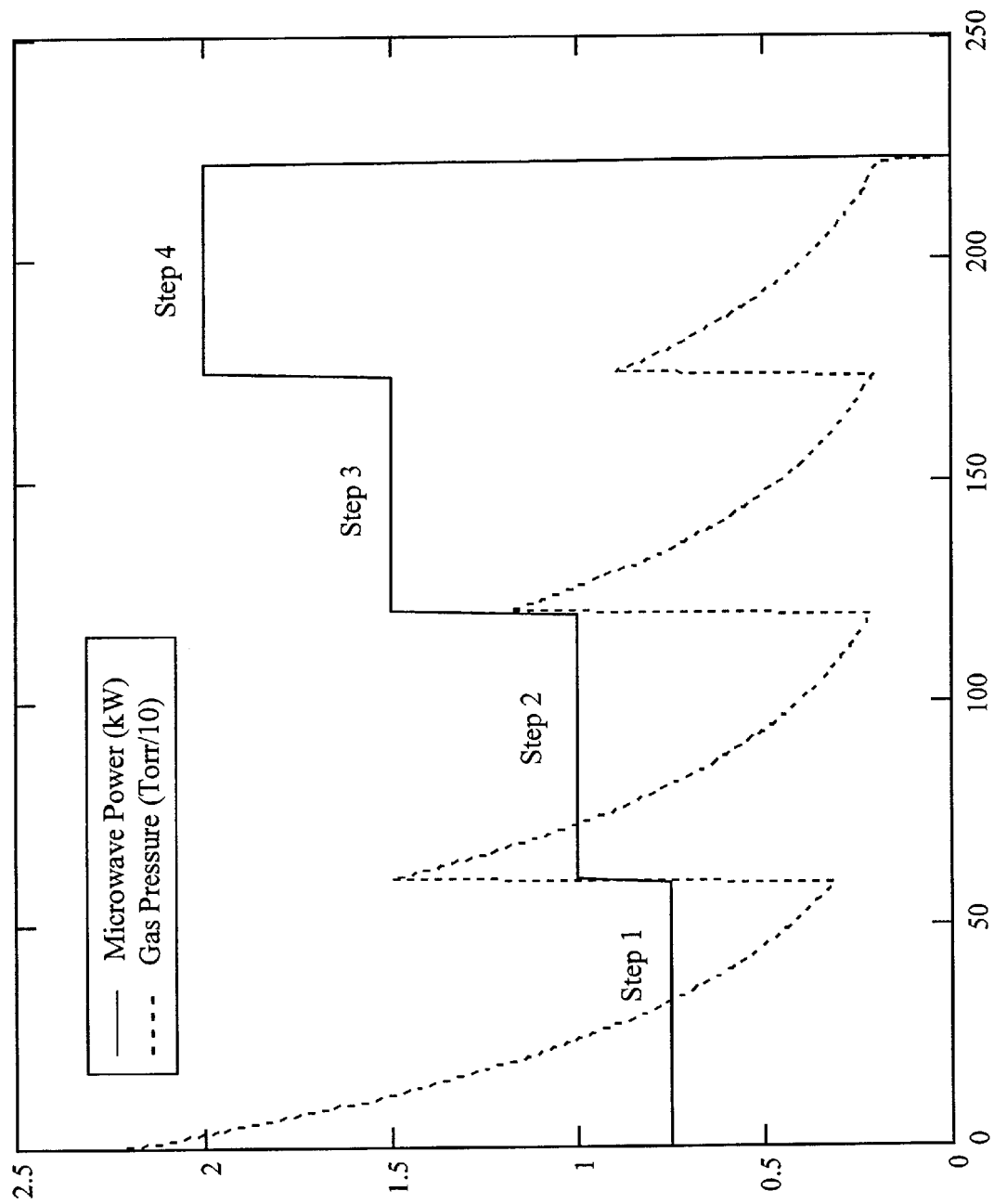
FIG. 9 is a graph illustration of the typical microwave power and gas pressure profiles during combined microwave and plasma processing of carbon fibers.

In the particular illustrated embodiment, the quartz tube 12 provides the oxygen-free chamber for processing and will contain the generated off-gases (effluents) from the fibers being processed. In a preferred embodiment, an internal pressure of about 3 to 6 Torr of nitrogen or argon gas should be established inside the quartz tube 20 to initiate the glow discharge. The microwave power then breaks down the background gas to establish a microwave glow-discharge plasma. The fiber is processed by moving the quartz tube back and forth through the waveguide applicator 10 in a reciprocating fashion with a period of approximately 4 seconds. This allows a section of the total length of the fibers in the H-frame to reach a temperature wherein a portion of the fiber's organic material is converted to carbon, resulting in the release of off-gasses. Given enough residence time and input microwave power, carbonization and subsequent graphitization will continue until acceptable levels of processing are reached. Microwave power and gas pressure for a typical processing run for fully oxidized or stabilized carbon fiber (PAN) precursor is shown in Table 1 below and illustrated in FIG. 9. The power is increased in discrete steps to allow for the gases evolved from the fiber to be eliminated by the vacuum system. When the pressure drops to around 3 to 6 Torr, the power is increased and the processing is repeated until a final fiber product has been obtained. It is believed that when the carbon fiber is processed using these steps, a surface undulation will occur on the fiber.

In the example cited, the fiber is being both carbonized and modified to provide an undulating surface topography. It is believed that the surface topography of prior carbonized or graphitized carbon fiber can just as easily be modified. In this case, the fiber is already processed and the evolved carbon fiber off-gas will be much less and the processing time will be much shorter than the recipe shown in FIG. 9 and Table 1.

Another aspect of the present inventions is that the disclosed method can also be performed in a continuous system where the microwave radiation and plasma is varied over a period time. Continuous systems to treat fibers are well known in the art and described previously by Listen et al., supra; and R. Diefendorf, "Carbon/Graphite Fibers," *Engineering Materials Handbook: Composites,* 38–42 (1987).

To vary the plasma and microwave radiation, one may simply modulate the microwave power to increase the intensity of the plasma energy and create a process gradient along the length of the fiber. For example, one may gradually increase the microwave power input to increase the intensity of the combined microwave and plasma energy and enhance the processing of the fiber to induce a reduction in the fiber's cross-sectional area. Once the desired cross-sectional area is reached, the power input could then be gradually decreased to slow the processing of the fiber and minimize the cross-sectional reduction. Such an application is likely to result in a gradual surface undulation with an extended period between peaks. Alternatively, one could apply a moderate pulse of microwave input power to cause a rapid decrease in the cross-sectional area and provide a surface undulation having a shortened period between peaks and/or substantial depth.

The net effect of scanning the tow across an intense region of plasma or the application of a varied pulse or scanned microwave radiation is the creation of a processing gradient along the length of the fiber. A beneficial effect of this variability in the fiber processing is the ability to develop localized regions along the fiber wherein the fiber is exposed to higher processing. Through this processing methodology, the enhancement of filament properties in discrete regions is also possible. These filament properties can include higher electrical resistivity, higher density, and higher mechanical strength than in the rest of the bulk carbon fiber.

Once the surface undulation has been completed, the fibers may be subjected to additional oxygen plasma treatments to enhance their adhesive characteristics. In this final step, the remaining oxygen-free gas and off-gases are removed from the plasma chamber and a small level of oxygen is introduced. This oxygen is then consumed by the plasma resulting in the treatment of the fiber's surface in a manner typically utilized in commonly known plasma surface treatments. Caution must be taken, however, to avoid introducing too much oxygen into the chamber as excess oxygen may result in a negative thermal reaction and loss of fiber product. Alternatively, the fibers may be removed from the plasma applicator system and treated with any one of the many plasma surface treatments known in the art which are used to modify the fiber surface's chemical structure.

Although the descriptions above the modification of reinforcement fibers using a single plasma chamber and a single source of microwave radiation, it is anticipated that a series of plasma chambers or a series of electromagnetic generators may be utilized to practice the disclosed method in a continuous process. These processes may include, without limitation, a continuous flow process similar to a kiln type application with no physical separation between stages in processing, or a continual sequence process having discrete processing stages. It is also anticipated that one of ordinary skill in the art would be sufficiently familiar with plasma operations to adjust the reaction to accommodate different fibers, gases, and systems to produce an undulated surface on the reinforcement fibers. Accordingly, this invention is not limited to the preferred embodiments and alternatives heretofore described, to which variations and improvements may be made.

TABLE 1

Carbon Fiber Processing Conditions

| Sample | Initial Fiber wt. | | | | | | | | Percent Wt. Loss |
|---|---|---|---|---|---|---|---|---|---|
| 5 | 6.01 g. | Power Input (Watts) | 400 | 500 | 600 | 700 | 800 | 900 | 43.0% |
|   |   | Minutes | 7 | 5 | 5 | 5 | 5 | 5 |   |
| 8 | 4.10 g. | Power Input (Watts) | 700 | 1000 | 1400 | 1700 | — | — | 45.0% |
|   |   | Minutes | 5 | 5 | 7 | 3 | — | — |   |
| 9 | 4.70 g. | Power Input (Watts) | 800 | 1200 | 1500 | 2000 | — | — | 51.3% |
|   |   | Minutes | 5 | 5 | 5 | 5 | — | — |   |
| 15 | 4.52 g. | Power Input (Watts) | 750 | 1000 | 1400 | 2000 | — | — | 44.0% |
|   |   | Minutes | 5 | 6 | 5 | 4 | — | — |   |
| 17 | 3.80 g. | Power Input (Watts) | 600 | 800 | 1000 | 1400 | 1800 | 2000 | 50.0% |
|   |   | Minutes | 3 | 3 | 5 | 5 | 5 | 5 |   |
| 18 | 4.40 g. | Power Input (Watts) | 700 | 1000 | 1500 | 2000 | — | — | 52.3% |
|   |   | Minutes | 4 | 4 | 4 | 4 | — | — |   |
| 19 | 3.60 g. | Power Input (Watts) | 700 | 1000 | 1500 | 1800 | — | — | 42.5% |
|   |   | Minutes | 4 | 4 | 5 | 4 | — | — |   |
| 21 | 4.00 g. | Power Input (Watts) | 600 | 800 | 1000 | 1400 | 1800 | 2000 | 50.0% |
|   |   | Minutes | 4 | 4 | 4 | 4 | 4 | 4 |   |

NOTE:
Initial pressure at each stage for each sample was approximately 3 to 6 TorrS.

We claim:

1. A method for producing an undulated surface on a reinforcement fiber, said method comprising the steps of:

submitting one or more fibers to a plasma in an oxygen-free atmosphere under pressure, each fiber being at least partially stabilized and under slight tension;

irradiating the plasma with a microwave radiation to provide a microwave generated plasma capable of modulating a cross-sectional area of the fiber along the fiber's longitudinal axis; and varying the intensity of the microwave generated plasma to vary the modulation of the cross-sectional area of the fibers and produce an undulated surface.

2. The method of claim 1 wherein the fiber is selected from the group consisting of inorganic fibers and organic fibers.

3. The method of claim 2 wherein the fiber is selected from the group consisting of carbon fibers, graphite fibers, rayon-based fibers, pitch-based fibers and polyacrylonitrile-based fibers, nylon-based fibers, cellulose-based fibers, aramide fibers, carbon fiber precursors, ceramic fibers, glass fibers, metal fibers and fibers made of silica carbide.

4. The method of claim 1 wherein the plasma originates from a gas selected from the group consisting of nitrogen, argon, helium, hydrogen, and a mixture thereof.

5. The method of claim 1 wherein the plasma intensity is varied by modulating the microwave radiation.

6. The method of claim 1 wherein the plasma intensity is varied by modulating the pressure.

7. The method of claim 1 wherein the microwave radiation is generated by an electromagnetic generator having an input power of between about 250 W and 100 kW.

8. The method of claim 7 wherein the microwave radiation is generated by an electromagnetic generator having an input power of between about 750 W and 15 kW.

9. The method of claim 1 wherein the cross-sectional area of the fiber is reduced by up to about 50%.

10. The method of claim 9 wherein the cross-sectional area of the fiber is reduced by up to about 30%.

11. The method of claim 10 wherein the cross-sectional area of the fiber is reduced by up to about 15%.

12. The method of claim 1 further comprising the step of treating the fiber with an oxygen plasma surface treatment.

13. The method of claim 12 wherein the oxygen plasma surface treatment modifies the chemical structure of the undulated surface of the fiber.

14. A method for producing an undulated surface on a reinforcement fiber, said method comprising the steps of:

submitting one or more fibers to a plasma in a plasma chamber, the plasma chamber having an oxygen-free atmosphere and under a controlled pressure, each fiber being at least partially stabilized and under slight tension;

irradiating the plasma with a microwave radiation to produce a non-uniform microwave generated plasma capable of modulating a cross-sectional area of the fiber along the fiber's longitudinal axis, the microwave radiation being generated by an electromagnetic generator having an input power of between about 250 W and 100 kW; and passing the fiber through the non-uniform microwave generated plasma to produce an undulated surface.

15. The method of claim 14 wherein the fiber is selected from the group consisting of inorganic fibers and organic fibers.

16. The method of claim 14 wherein the fiber is selected from the group consisting of carbon fibers, graphite fibers, rayon-based fibers, pitch-based fibers and polyacrylonitrile-based fibers, nylon-based fibers, cellulose-based fibers, aramide fibers, carbon fiber precursors, ceramic fibers, glass fibers, metal fibers and fibers made of silica carbide.

17. The method of claim 14 wherein the plasma originates from a gas selected from the group consisting of nitrogen, argon, helium, hydrogen, and a mixture thereof.

18. The method of claim 14 wherein the microwave radiation is directed towards the plasma chamber by a waveguide.

19. The method of claim 18 wherein the microwave generated plasma is made non-uniform by irradiating the plasma chamber with the microwave radiation at an angle that causes the microwave generated plasma to have an area of increased plasma intensity.

20. The method of claim 19 wherein the fiber is translated over the area of increased plasma intensity to produce the undulated surface.

21. The method of claim 14 wherein the microwave generated plasma is made non-uniform by modulating the input power for the microwave radiation over a period of time.

22. The method of claim 21 wherein the modulation of the input power over time is created by a pulsing of the input power.

23. The method of claim 14 wherein the microwave radiation is generated by an electromagnetic generator having an input power of between about 750 W and 15 kW.

24. The method of claim 14 wherein the cross-sectional area of the fiber is reduced by up to about 50%.

25. The method of claim 24 wherein the cross-sectional area of the fiber is reduced by up to about 30%.

26. The method of claim 25 wherein the cross-sectional area of the fiber is reduced by up to about 15%.

27. The method of claim 14 further comprising the step of treating the fiber with an oxygen plasma surface treatment.

28. The method of claim 27 wherein the oxygen plasma surface treatment modifies the chemical structure of the undulated surface of the fiber.

* * * * *

UNITED STATES PATENT AND TRADEMARK OFFICE
CERTIFICATE OF CORRECTION

PATENT NO.   : 6,514,449 B1
DATED        : February 4, 2003
INVENTOR(S)  : Felix L. Paulauskas; Terry L. White and Timothy S. Bigelow It is certified that error appears in the above-identified patent and that said Letters Patent is hereby corrected as shown below:

<u>Column 4,</u>
Line 35, "schematic are" should be -- are schematic --.

<u>Column 9,</u>
Lines 25 and 26, "quartz tube by" should be -- quartz tube 20 by--.

Signed and Sealed this

Fourth Day of November, 2003

JAMES E. ROGAN
*Director of the United States Patent and Trademark Office*